United States Patent
Mogami

(10) Patent No.: US 10,611,935 B2
(45) Date of Patent: Apr. 7, 2020

(54) ADHESIVE COMPOSITION

(71) Applicant: Fujikura Kasei Co., Ltd., Tokyo (JP)

(72) Inventor: Hirokazu Mogami, Kuki (JP)

(73) Assignee: Fujikura Kasei Co., Ltd., Tokyo (JP)

( * ) Notice: Subject to any disclaimer, the term of this patent is extended or adjusted under 35 U.S.C. 154(b) by 68 days.

(21) Appl. No.: 15/570,387

(22) PCT Filed: Apr. 27, 2016

(86) PCT No.: PCT/JP2016/063212
§ 371 (c)(1),
(2) Date: Oct. 30, 2017

(87) PCT Pub. No.: WO2016/181842
PCT Pub. Date: Nov. 17, 2016

(65) Prior Publication Data
US 2018/0148617 A1    May 31, 2018

(30) Foreign Application Priority Data
May 14, 2015 (JP) .................. 2015-098889

(51) Int. Cl.
*C09J 153/00* (2006.01)
*C09J 133/08* (2006.01)
*C09J 11/06* (2006.01)
*C08F 293/00* (2006.01)

(52) U.S. Cl.
CPC ......... *C09J 153/00* (2013.01); *C08F 293/005* (2013.01); *C09J 11/06* (2013.01); *C09J 133/08* (2013.01); *C08F 2438/03* (2013.01)

(58) Field of Classification Search
CPC ........ C09J 153/00; C09J 11/06; C09J 133/08; C08F 293/005; C08F 2438/03
USPC .......................................... 524/272
See application file for complete search history.

(56) References Cited

U.S. PATENT DOCUMENTS

| 10,053,602 | B2 * | 8/2018 | Mogami | C09J 153/00 |
| 2006/0024521 | A1 | 2/2006 | Everaerts et al. | |
| 2006/0173124 | A1 * | 8/2006 | Paul | C08F 293/005 |
| | | | | 524/558 |

FOREIGN PATENT DOCUMENTS

| CN | 1814686 A | 8/2006 | |
| CN | 101821332 A | 9/2010 | |
| CN | 102268230 A | 12/2011 | |
| CN | 104603222 A | 5/2015 | |
| EP | 1433799 A2 | 6/2004 | |
| JP | 2010076261 A | 4/2010 | |
| JP | 2010265477 A | 11/2010 | |
| JP | 2012064691 A | 3/2012 | |
| JP | 2014208762 A * | 11/2014 | C09J 153/00 |
| JP | 2014208762 A | 11/2014 | |

* cited by examiner

*Primary Examiner* — Kelechi C Egwim
(74) *Attorney, Agent, or Firm* — Wood Herron & Evans LLP

(57) ABSTRACT

An adhesive composition, includes a block copolymer (X) formed of a block (A) and a block (B), the block (A) having a glass transition temperature of 75° C. or higher, the block (A) including a monomer unit having a first cyclic structure and a carboxyl group-containing monomer unit, the block (B) including 70% or more of an acrylic acid ester unit represented by General Formula (1); and a tackifier (Y) having a softening point of 120° C. or higher and a second cyclic structure, in which a mass ratio of the block (A) to the block (B) (block (A)/block (B)) is 10/90 to 40/60, in an acid value of the block copolymer (X), an acid value derived from the block (A) is 8 mgKOH/g or more, and at least one end of the block copolymer (X) is the block (A).

3 Claims, No Drawings

ADHESIVE COMPOSITION

TECHNICAL FIELD

The present invention relates to an adhesive composition.

Priority is claimed on Japanese Patent Application No. 2015-098889, filed on May 14, 2015, the content of which is incorporated herein by reference.

BACKGROUND ART

As adhesives that are used for industrial applications and the like, acrylic adhesives including an acryl copolymer are generally used since the adhesives can be easily manufactured at low cost.

Adhesives need to have not only an adhesive force but also durability under a variety of conditions depending on applications. For example, even when used in high-temperature environments, adhesives need to be not easily misaligned from a subject to which an adherend is attached by external forces or the like (thermal creep resistance).

In the case of operating an electrostatic capacitance-type touch panel display or the like, there are cases in which static electricity generated on the front panel reaches the touch panel as a leak current and the static electricity is applied to the touch panel. Therefore, adhesives that are used to attach front panels and touch panels need to have insulation breakdown resistance so as to prevent static electricity from reaching touch panels. In recent years, there has been a tendency that the area or thickness of adhesive layers decreases in response to the size reduction of displays or an increase in the size of screens, and thus there is a demand for improving the insulation breakdown resistance of adhesives.

Patent Document 1 discloses a highly insulating heat-diffusive sheet made of a composition in which a thermoplastic elastomer, a thermoplastic resin, and, as a binder, one or more polymers selected from the group consisting of acryl rubber and acrylic adhesives are used and 50% to 90% by volume of boron nitride having a flat shape having an aspect ratio of 10 to 1,000 is blended as a heat diffusion filler into the binder.

Patent Document 2 discloses a flame-retardant heat-resistant adhesive tape capable of suppressing carbonization insulation breakdown which includes a support having one or more layers made of a polyester polyurethane resin crosslinked by a polyisocyanate-based crosslinking agent laminated on at least one surface of an impregnation sheet formed by impregnating the resin in a non-woven fabric and an adhesive layer made of an acrylic adhesive or the like which is provided on at least one surface of the support.

PRIOR ART DOCUMENTS

Patent Documents

[Patent Document 1] Japanese Unexamined Patent Application, First Publication No. 2012-64691

[Patent Document 2] Japanese Unexamined Patent Application, First Publication No. 2010-76261

SUMMARY OF THE INVENTION

Problems to be Solved by the Invention

However, since the composition described in Patent Document 1 includes 50% to 90% by volume of boron nitride, the insulating property is excellent, but the adhesive force easily degrades.

In the case of the flame-retardant heat-resistant adhesive tape described in Patent Document 2, the insulating property is exhibited by the impregnation sheet, but the adhesive layer itself does not have any insulating property. Therefore, it is not suitable to singly use the adhesive layer in applications requiring insulation breakdown resistance.

The present invention has been made in consideration of the above-described circumstances, and an object of the present invention is to provide an adhesive composition having a high adhesive force, excellent insulation breakdown resistance, and excellent thermal creep resistance.

Means for Solving the Problems

An adhesive composition according to an aspect of the present invention includes a block copolymer (X) formed of a block (A) and a block (B), the block (A) having a glass transition temperature of 75° C. or higher, the block (A) including a monomer unit having a first cyclic structure and a carboxyl group-containing monomer unit, the block (B) including 70% or more of an acrylic acid ester unit represented by General Formula (1); and a tackifier (Y) having a softening point of 120° C. or higher and a second cyclic structure, wherein a mass ratio of the block (A) to the block (B) (block (A)/block (B)) is 10/90 to 40/60, in an acid value of the block copolymer (X), an acid value derived from the block (A) is 8 mgKOH/g or more, at least one end of the block copolymer (X) is the block (A), a content of the tackifier (Y) is 5 to 40 parts by mass with respect to 100 parts by mass of the block copolymer (X), the General Formula (1) is $CH_2=CR^1-COOR^2$, and $R^1$ represents a hydrogen atom, and $R^2$ represents a linear alkyl group or alkoxyalkyl group having 8 or less carbon atoms.

The first cyclic structure in the block (A) and the second cyclic structure in the tackifier (Y) may be aromatic ring structures.

Effects of Invention

The adhesive composition according to the aspect of the present invention has a high adhesive force, excellent insulation breakdown resistance, and excellent thermal creep resistance.

EMBODIMENTS FOR CARRYING OUT THE INVENTION

Hereinafter, an embodiment of the present invention will be described in detail.

In the present embodiment, "(meth)acrylic acid" is a collective term for acrylic acid and methacrylic acid.

In addition, in the present embodiment, reversible addition-fragmentation chain-transfer polymerization will be referred to as "RAFT polymerization", and a chain transfer agent that is used for the RAFT polymerization will be referred to as "RAFT agent".

"Adhesive Composition"

The adhesive composition according to the present embodiment contains a block copolymer (X) formed of a block (A) and a block (B) and a tackifier (Y) having a cyclic structure.

<Block (A)>

The block (A) is a polymer or copolymer having a glass transition temperature of 75° C. or higher.

When the glass transition temperature is 75° C. or higher, the adhesive composition having excellent insulation breakdown resistance can be obtained.

The glass transition temperature of the block (A) is preferably 80° C. or higher and more preferably 90° C. or higher.

The glass transition temperature of the block (A) is a value obtained from the Fox equation represented by Equation (i).

$$1/(Tg_A+273.15)=\Sigma[W_a/(Tg_a+273.15)] \qquad (i)$$

In Equation (i), $Tg_A$ represents the glass transition temperature (° C.) of the block (A).

In addition, $W_a$ in Equation (i) represents the mass fraction of a monomer a constituting the block (A).

$Tg_a$ in Equation (i) represents the glass transition temperature (° C.) of a homopolymer of the monomer a.

$Tg_a$ is widely known as a characteristic value of homopolymers, and, for example, the value described in "POLYMER HANDBOOK, THIRD EDITION" or the manufacturer's catalog value may be used.

The glass transition temperature of the block (A) can be adjusted using the type of monomers constituting the block (A) or the blending amount of the monomers constituting the block (A).

Examples of the monomers constituting the block (A) include monomers having a cyclic structure (first cyclic structure), carboxyl group-containing monomers, (meth) acrylic acid esters (here, monomers having a cyclic structure are excluded), hydroxyl group-containing monomers, and the like. The block (A) includes at least a monomer unit having a cyclic structure and a carboxyl group-containing monomer unit.

Examples of the monomers having a cyclic structure (first cyclic structure) include monomers having an aromatic ring structure, monomers having an alicyclic structure, and the like.

Examples of the monomers having an aromatic ring structure include aromatic vinyl compounds such as styrene, α-methylstyrene, o-, m-, or p-methylstyrene, and o-, m-, or p-chlorostyrene; (meth)acrylic acid esters having an aromatic ring structure such as benzyl (meth)acrylate and 2-phenoxyethyl (meth)acrylate; and the like.

Examples of the monomers having an alicyclic structure include (meth)acrylic acid esters having an alicyclic structure such as cyclohexyl (meth)acrylate, dicyclopentanyl (meth)acrylate, and isobornyl (meth)acrylate; and the like.

These monomers may be used singly or two or more monomers may be jointly used.

Among these, from the viewpoint of further improving the creep property in high-temperature environments (hereinafter, also referred to as "thermal creep resistance") and the insulation breakdown resistance, the monomers having an aromatic ring structure are preferred, and styrene is particularly preferred.

When the content of all of the constituent units constituting the block (A) is 100 mass %, the content of the monomer unit having a cyclic structure (first cyclic structure) is preferably 50 mass % to 95 mass % and more preferably 65 mass % to 90 mass %.

Examples of the carboxyl group-containing monomers include (meth)acrylic acid, β-carboxyethyl (meth)acrylate, carboxypentyl (meth)acrylate, itaconic acid, crotonic acid, maleic acid, fumaric acid, and the like. These monomers may be used singly or two or more monomers may be jointly used.

When the content of all of the constituent units constituting the block (A) is 100 mass %, the content of the carboxyl group-containing monomer unit is preferably 3 mass % to 40 mass % and more preferably 4 mass % to 30 mass %.

Examples of the (meth)acrylic acid esters include alkyl (meth)acrylate esters and alkoxyalkyl (meth)acrylate esters which do not have a cyclic structure.

Examples of the alkyl (meth)acrylate esters not having a cyclic structure include methyl (meth)acrylate, ethyl (meth) acrylate, butyl (meth)acrylate, isobutyl (meth)acrylate, 2-ethylhexyl (meth)acrylate, and the like. These monomers may be used singly or two or more monomers may be jointly used.

Examples of the alkoxyalkyl (meth)acrylate esters not having a cyclic structure include 2-methoxyethyl (meth) acrylate, 2-ethoxyethyl (meth)acrylate, 2-(n-propoxy)ethyl (meth)acrylate, 2-(n-butoxy)ethyl (meth)acrylate, 3-methoxypropyl (meth)acrylate, 3-ethoxypropyl (meth) acrylate, 2-(n-propoxy)propyl acrylate, 2-(n-butoxy)propyl (meth)acrylate, and the like. These monomers may be used singly or two or more monomers may be jointly used.

When the content of all of the constituent units constituting the block (A) is 100 mass %, the content of the (meth)acrylic acid ester unit is preferably 5 mass % to 50 mass % and more preferably 5 mass % to 35 mass %.

Examples of the hydroxyl group-containing monomers include 2-hydroxyethyl (meth)acrylate, 2-hydroxypropyl (meth)acrylate, 4-hydroxypropyl (meth)acrylate, 6-hydroxyhexyl (meth)acrylate, 8-hydroxyoctyl (meth)acrylate, 10-hydroxydecyl (meth)acrylate, 12-hydroxylauryl (meth) acrylate, (4-hydroxymethylcyclohexyl).methyl acrylate, and the like. These monomers may be used singly or two or more monomers may be jointly used.

When the content of all of the constituent units constituting the block (A) is 100 mass %, the content of the hydroxyl group-containing monomer unit is preferably 0.1 mass % to 10 mass % and more preferably 0.5 mass % to 5 mass %.

The combination of the monomers constituting the block (A) is not particularly limited as long as the glass transition temperature of the block (A) is 75° C. or higher and the block (A) includes the monomer unit having a cyclic structure (first cyclic structure) and the carboxyl group-containing monomer unit, but at least the monomer having a cyclic structure and the carboxyl group-containing monomer are used. The reasons for using the monomer having a cyclic structure are as described below.

The block (A) causes microphase separation due to the difference in miscibility from a block (B) described below. Particularly, the block (A) that can be obtained using the monomer having a cyclic structure has a significant difference in miscibility from the block (B) and is likely to cause microphase separation. In a case in which the block (A) causes microphase separation, the molecular arrangement of the block copolymer (X) becomes an arrangement in which the block (A) molecules are adjacent to each other and the block (B) molecules are adjacent to each other. As a result, the block (A) having a higher glass transition temperature than the block (B) serves as pseudo-crosslinking points for the block copolymer (X) molecules. In such a case, it is considered that the structure of the block copolymer (X) becomes a pseudo-crosslinked structure, the block copolymer (X) has the same function as crosslinked acrylic copolymers having a high molecular weight, and the thermal creep resistance of the adhesive composition improves.

In addition, the joint use of the block copolymer (X) and the tackifier (Y) described below improves the insulation breakdown resistance of the adhesive composition. The reason therefor is considered as described below.

When the block copolymer (X) and the tackifier (Y) are mixed with each other, a cyclic structure (second cyclic structure) in the tackifier (Y) is attracted to the cyclic structure (first cyclic structure) in the block (A) constituting the block copolymer (X), and thus the tackifier (Y) accumulates around the block (A). As a result, a pseudo-massive structure is formed by the cyclic structure (first cyclic structure) of the block (A) and the cyclic structure (second cyclic structure) of the tackifier (Y) in the adhesive composition, and the pseudo-massive structure functions as an insulating filler, whereby the insulation breakdown resistance of the adhesive composition is considered to improve.

The reason for using the carboxyl group-containing monomer is as described below.

The use of the carboxyl group-containing monomer allows the block (A) to be obtained with carboxyl groups derived from the carboxyl group-containing monomer. When the block (A) has carboxyl groups, chemical bonding forces are generated among the segments of the block copolymer (X) by the hydrogen bonds among the carboxyl groups, and the heat resistance improves. Additionally, the pseudo-crosslinking structure is likely to be stable, and the thermal creep resistance further improves.

<Block (B)>

The block (B) is a polymer or copolymer including an acrylic acid ester unit represented by General Formula (1).

$$CH_2=CR^1-COOR^2 \quad (1)$$

In Formula (1), $R^1$ represents a hydrogen atom.

$R^2$ represents a linear alkyl group or alkoxyalkyl group having 8 or less carbon atoms.

When the number of carbon atoms in $R^2$ exceeds eight, a sufficient adhesive force cannot be obtained. In addition, when the alkyl group or alkoxyalkyl group has a branched shape, the adhesive force degrades.

The number of carbon atoms in $R^2$ is preferably four or more. When the number of carbon atoms is four or more, the wetting property of the adhesive composition to adherends becomes favorable, and a zipping phenomenon during peeling does not easily occur.

Examples of the linear alkyl group having 8 or less carbon atoms include a methyl group, an ethyl group, a propyl group (n-propyl group), a butyl group (n-butyl group), a pentyl group, a hexyl group, a heptyl group, an octyl group, and the like.

Examples of the linear alkoxyalkyl group having 8 or less carbon atoms include 2-methoxyethyl group, 2-ethoxyethyl group, 2-(n-propoxy)ethyl group, 2-(n-butoxy)ethyl group, 3-methoxypropyl group, 3-ethoxypropyl group, 2-(n-propoxy)propyl group, 2-(n-butoxy)propyl group, and the like.

$R^2$ is preferably a linear alkyl group having 8 or less carbon atoms.

The block (B) can be obtained by polymerizing at least the acrylic acid esters represented by General Formula (1). The block (B) is a copolymer obtained by copolymerizing a homopolymer of the acrylic acid ester represented by General Formula (1) or the acrylic acid ester represented by General Formula (1) and a monomer capable of being copolymerized with the acrylic acid ester (hereinafter, referred to as "optional monomer").

Examples of the acrylic acid ester represented by General Formula (1) include alkyl acrylate esters such as methyl acrylate, ethyl acrylate, propyl acrylate, butyl acrylate, pentyl acrylate, hexyl acrylate, heptyl acrylate, and octyl acrylate; alkoxyalkyl acrylate esters such as 2-methoxyethyl acrylate, 2-ethoxyethly acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate, and 2-(n-butoxy)propyl acrylate; and the like.

These acrylic acid esters may be used singly or two or more acrylic acid ester may be jointly used. Among these, butyl acrylate is preferred.

When the content of all of the constituent units constituting the block (B) is 100 mass %, the content of the acrylic acid ester unit represented by General Formula (1) is 70 mass % or more, preferably 80 mass % or more, and more preferably 90 mass %. When the content of all of the constituent units constituting the block (B) is 100 mass % and the content of the acrylic acid ester unit represented by General Formula (1) is 70 mass % or more, a sufficient adhesive force and sufficient thermal creep resistance can be obtained.

Examples of the optional monomer include (meth)acrylic acid esters other than the acrylic acid ester represented by General Formula (I) (hereinafter, referred to as "other (meth) acrylic acid esters") and the like.

Examples of the other (meth)acrylic acid esters include monomers in which R' in General Formula (1) is a hydrogen atom or a methyl group and $R^2$ is an alkyl group or alkoxyalkyl group having more than 8 carbon atoms; monomers in which R' is a hydrogen atom or a methyl group and $R^2$ is a branched alkyl group or alkoxyalkyl group; monomers in which an optional hydrogen atom in the alkyl group or alkoxyalkyl group as $R^2$ is substituted with a hydroxyl group; and the like. Specific examples thereof include nonyl (meth)acrylate, decyl (meth)acrylate, isopropyl (meth)acrylate, isobutyl (meth)acrylate, 2-ethylhexyl (meth)acrylate, cyclohexyl (meth)acrylate, isobornyl (meth)acrylate, t-butyl (meth)acrylate, and the like. These (meth)acrylic acid esters may be used singly or two or more (meth)acrylic acid esters may be jointly used.

When the content of all of the constituent units constituting the block (B) is 100 mass %, the content of the optional monomer unit is 30 mass % or less, preferably 20 mass % or less, and more preferably 10 mass % or less.

The glass transition temperature of the block (13) is preferably −30° C. or lower and more preferably −40° C. or lower. When the glass transition temperature is −30° C. or lower, the adhesive force can be sufficiently developed.

The glass transition temperature of the block (B) can be adjusted by the type of monomers constituting the block (B) or the blending amount of the monomers constituting the block (B).

The glass transition temperature of the block (B) is a value obtained from the Fox equation represented by Equation (ii).

$$1/(Tg_B+273.15)=\Sigma[W_b/(Tg_b+273.15)] \quad (ii)$$

In Equation (ii), $Tg_B$ represents the glass transition temperature (° C.) of the block (B).

In addition, $W_b$ in Equation (ii) represents the mass fraction of a monomer b constituting the block (B).

$Tg_b$ in Equation (ii) represents the glass transition temperature (° C.) of a homopolymer of the monomer b.

Note that $Tg_b$ is widely known as a characteristic value of homopolymers, and, for example, the value described in "POLYMER HANDBOOK, THIRD EDITION" or the manufacturer's catalog value may be used.

<Block Copolymer (X)>

The block copolymer (X) is formed of the block (A) and the block (B) described above.

The ratio of the block (A) to the block (B) (block (A)/block (B)) is 10/90 to 40/60, preferably 15/85 to 30/70, and more preferably 15/85 to 25/75. In a case in which the ratio of the block (A) increases, the adhesive force degrades, and the zipping phenomenon during peeling easily occurs. On the other hand, in a case in which the ratio of the block (A) decreases, the thermal creep resistance degrades.

At least one end of the block copolymer (X) is the block (A). When at least one end of the block copolymer (X) is the block (A), the adhesive composition having excellent thermal creep resistance can be obtained.

In addition, the block copolymer (X) preferably has a structure in which the block (B) is sandwiched by the blocks (A). When the block (B) is sandwiched by the blocks (A), the above-described microphase separation is likely to occur, and the thermal creep resistance further improves. Particularly, the block copolymer (X) is preferably a triblock body represented by the block (A)-the block (B)-the block (A).

Regarding the acid value of the block copolymer (X), the acid value derived from the block (A) is 8 mgKOH/g or more and preferably 15 mgKOH/g or more. In a case in which the acid value derived from the block (A) is less than 8 mgKOH/g, it is difficult for the block copolymer (X) to form the above-described pseudo-crosslinking structure, and the thermal creep resistance degrades. In addition, even when the acid value of the block copolymer (X) is 8 mgKOH/g or more, in a case in which the acid value derived from the block (A) is less than 8 mgKOH/g, the thermal creep resistance degrades as described above. Particularly, in a case in which the acid value of the block copolymer (X) is all derived from the block (B), the insulation breakdown resistance also tends to degrade.

The acid value of the block copolymer (X) is preferably 50 mgKOH/g or less and more preferably 40 mgKOH/g or less from the viewpoint of improving the storage stability.

A part of the acid value of the block copolymer (X) may be derived from the block (B), but the acid value of the block copolymer (X) is all preferably derived from the block (A). When the acid value of the block copolymer (X) is all derived from the block (A) (that is, the block (B) does not have acid values), microphase separation can be efficiently caused, and it is possible to stably form the pseudo-crosslinking structure. Additionally, the insulation breakdown resistance also further improves.

Note that, in a case in which a part of the acid value of the block copolymer (X) is derived from the block (B), the acid value derived from the block (B) is preferably 25 mgKOH/g or less.

Here, the acid value of the block copolymer (X) refers to the amount (milligrams) of potassium hydroxide necessary to neutralize acids in 1 g of the block copolymer (X).

Whether the acid value of the block copolymer (X) is derived from the block (A), the block (B), or both the block (A) and the block (B) can be determined from the content of acid components (for example, (meth)acrylic acid and the like) in monomer components constituting the block (A) and the block (B). For example, in a case in which a monomer component (a) constituting the block (A) includes an acid component and a monomer component (b) constituting the block (B) does not include any acid components, the acid value of the block copolymer (X) is determined to be all derived from the block (A). In addition, in a case in which the monomer components (a) and (b) both include acid components, the mass ratio between acid components in the respective monomer components when the total of the contents of all of the acid components is 100 mass % becomes the ratio between the acid value derived from the block (A) and the acid value derived from the block (B) in the acid value of the block copolymer (X).

The mass-average molecular weight of the block copolymer (X) is preferably 100,000 to 550,000.

In a case in which the mass-average molecular weight of the block copolymer (X) is 100,000 or more, the thermal creep resistance further improves. On the other hand, in a case in which the mass-average molecular weight of the block copolymer (X) is 550,000 or less, the coating properties further improves.

The mass-average molecular weight of the block copolymer (X) refers to a value measured by gel permeation chromatography. Specifically, tetrahydrofuran (THF) is used as a mobile phase, and the molecular weight is measured by gel permeation chromatography under a condition of a flow rate of 1.0 mL/minute and is converted to a polystyrene-equivalent value, thereby obtaining the mass-average molecular weight.

(Method for Manufacturing Block Copolymer (X))

The block copolymer (X) is obtained by, for example, living polymerization. Examples of the living polymerization include living anionic polymerization, RAFT polymerization, and the like, and RAFT polymerization is particularly preferred.

In a case in which the block copolymer (X) is manufactured by RAFT polymerization, the monomers constituting the block (A) are polymerized or copolymerized using a RAFT agent so as to obtain the block (A), and then the monomers constituting the block (B) are polymerized or copolymerized in the presence of the obtained block (A), thereby manufacturing the block copolymer (X).

As the RAFT agent that is used for the RAFT polymerization, sulfur-based compounds such as dithioesters, dithiocarbonates, trithiocarbonates, and xanthate can be used.

As a polymerization initiator that is used for the RAFT polymerization, known azo-based polymerization initiators or peroxide-based polymerization initiators can be used.

A solvent that is used for the RAFT polymerization is not particularly limited, and well-known solvents can be used.

The method for the RAFT polymerization is not particularly limited, well-known methods can be employed, and examples thereof include a solution polymerization method, an emulsification polymerization method, a bulk polymerization method, a suspension polymerization method, and the like.

<Tackifier (Y)>

The tackifier (Y) has a cyclic structure (second cyclic structure).

Examples of the tackifier (Y) having the cyclic structure (second cyclic structure) include tackifiers having an aromatic ring structure and tackifiers having an alicyclic structure.

Examples of the tackifiers having an aromatic ring structure include rosin-based tackifiers, terpene-based tackifiers, xylene resins, and the like. These tackifiers may be used singly or two or more tackifiers may be jointly used.

Specific examples of the rosin-based tackifiers include rosin resins, polymerized rosin resins, rosin ester resins, polymerized rosin ester resins, hydrogenated rosin resins, hydrogenated rosin ester resins, rosin phenol resins, and the like.

Specific examples of the terpene-based tackifiers include terpene resins, terpene phenol resins, aromatic modified terpene resins, and the like.

These tackifiers may be used singly or two or more tackifiers may be jointly used.

Examples of the tackifiers having an alicyclic structure include alicyclic hydrocarbon-based tackifiers and the like.

Specific examples of the alicyclic hydrocarbon-based tackifiers include alicyclic saturated hydrocarbon resins, alicyclic unsaturated hydrocarbon resins, and the like.

These alicyclic hydrocarbon-based tackifiers may be used singly or two or more alicyclic hydrocarbon-based tackifiers may be jointly used.

As the tackifier (Y), commercially available products may also be used or compounds synthesized using well-known manufacturing methods may also be used.

Examples of the commercially available products of the rosin-based tackifiers include "PENSEL D-135", "SUPER ESTER A-125", and "PINECRYSTAL KE-604" manufactured by Arakawa Chemical Industries, Ltd.; "DS-130" manufactured by Harima Chemicals Group, Inc.; and the like.

Examples of the commercially available products of the terpene-based tackifiers include "YS POLYSTER TH130", "YS POLYSTER G150", and "YS POLYSTER T-160" manufactured by Yasuhara Chemical Co., Ltd.; "SUMILITE RESIN PR-12603" manufactured by Sumitomo Bakelite Co., Ltd.; and the like.

Examples of the xylene resins include "NIKANOL HP150", "NIKANOL HP-120", and the like manufactured by Fudow Co., Ltd.

Examples of the alicyclic hydrocarbon-based tackifiers include "ARKON M-135" and "ARKON P-140" manufactured by Arakawa Chemical Industries, Ltd.; "Quintone 1525L" manufactured by Zeon Corporation; and the like.

The cyclic structure (second cyclic structure) in the tackifier (Y) and the cyclic structure (first cyclic structure) in the block (A) constituting the above-described block copolymer (X) are preferably compounds of the same system. That is, in a case in which the block (A) includes the monomer unit having an aromatic ring structure, the tackifier (Y) is preferably a tackifier having an aromatic ring structure. In addition, in a case in which the block (A) includes the monomer unit having an alicyclic structure, the tackifier (Y) is preferably a tackifier having an alicyclic structure. From the viewpoint of further improving the insulation breakdown resistance of the adhesive composition, the cyclic structure (first cyclic structure) in the block (A) and the cyclic structure (second cyclic structure) in the tackifier (Y) are preferably aromatic ring structures. The reason therefor is considered to be as described below.

The aromatic ring structure causes smaller steric hindrances compared with alicyclic structures. Therefore, in a case in which the cyclic structure (first cyclic structure) in the block (A) and the cyclic structure (second cyclic structure) in the tackifier (Y) have an aromatic ring structure, the aromatic ring structure in the tackifier (Y) is likely to be attracted to the aromatic ring structure in the block (A), and the tackifier (Y) accumulates around the block (A), whereby the insulation breakdown resistance of the adhesive composition is considered to further improve.

The softening point of the tackifier (Y) is 120° C. or higher and preferably 130° C. or higher. When the softening point is 120° C. or higher, the insulation breakdown resistance of the adhesive composition improves.

While described in detail below, in the case of manufacturing the adhesive composition, it is preferable to dissolve the tackifier (Y) in a solvent in advance and mix the tackifier with the block copolymer (X) in a solution state. The upper limit value of the softening point of the tackifier (Y) is not particularly limited, but is 200° C. as one aspect.

The softening point of the tackifier (Y) is obtained by differential scanning calorimetry (DSC).

The content of the tackifier (Y) in the adhesive composition is 5 to 40 parts by mass and preferably 10 to 30 parts by mass with respect to 100 parts by mass of the block copolymer (X). When the content of the tackifier (Y) is 5 parts by mass or more, the insulation breakdown resistance of the adhesive composition improves. On the other hand, when the content of the tackifier (Y) is 40 parts by mass or less, the adhesive force and thermal creep resistance of the adhesive composition can be favorably maintained.

<Other Components>

The adhesive composition according to the present embodiment may contain additives such as an ultraviolet absorber, an antioxidant, a preservative, a fungicide, a plasticizer, an antifoaming agent, and a wettability adjusting agent as necessary. From the viewpoint of favorably maintaining the storage stability of the adhesive composition, the adhesive composition preferably does not include isocyanate or a silane coupling agent.

<Method for Manufacturing Adhesive Composition>

The adhesive composition can be obtained by mixing the block copolymer (X) and the tackifier (Y). Specifically, the tackifier (Y) is added to a reaction solution including the block copolymer (X) manufactured by living polymerization or the like, thereby obtaining the adhesive composition. From the viewpoint of ease of dissolving the tackifier (Y) in the reaction solution, it is preferable to dissolve the tackifier (Y) in a solvent in advance and add the solution to the reaction solution including the block copolymer (X) in a solution (tackifier solution) state.

Examples of the solvent that is used for the tackifier solution include aromatic hydrocarbon-based solvents such as benzene, toluene, and xylene; ketone-based solvents such as acetone, methyl ethyl ketone, cyclohexanone, and methyl isobutyl ketone; ester-based solvents such as ethyl acetate and butyl acetate; and the like.

The solvent that is used for the tackifier solution and the solvent that is used for the manufacturing of the block copolymer (X) may be solvents of the same type or solvents of different types.

<Functions and Effects>

The above-described adhesive composition according to the present embodiment contains the block copolymer (X) formed of the block (A) and the block (B) and is thus excellent in terms of the adhesive force and the creep property in high-temperature environments. As described above, the block copolymer (X) causes microphase separation due to the difference in miscibility between the block (A) and the block (B). As a result, the block (A) serves as pseudo-crosslinking points for the block copolymer (X) molecules. Furthermore, microphase separation structures are more clearly formed among the molecules, and thus the pseudo-crosslinking points are maintained. Therefore, the structure of the block copolymer (X) becomes a pseudo-crosslinking structure, the performance of the adhesive is maintained even in high-temperature environments, and it is considered that the adhesive force and the thermal creep resistance become excellent.

Additionally, the adhesive composition according to the present embodiment also contains the tackifier (Y) and is thus also excellent in terms of the insulation breakdown resistance.

From the viewpoint of imparting insulation breakdown resistance, a filler or the like may be blended as an insulating material into the adhesive as described in Patent Document 1. However, in order to develop sufficient insulation breakdown resistance, it is necessary to add a large amount of a filler, and consequently, there is a problem of the degradation of the adhesive force.

Regarding this problem, in the adhesive composition according to the present embodiment, in a case in which the block copolymer (X) and the tackifier (Y) are mixed with each other as described above, the tackifier (Y) accumulates around the block (A) in the block copolymer (X). As a result, a pseudo-massive structure is formed by the cyclic structure of the block (A) and the cyclic structure of the tackifier (Y), and the pseudo-massive structure functions as an insulating filler, whereby the insulation breakdown resistance is considered to improve. In addition, the block (B) in the block copolymer (X) is also a component contributing to the adhesive force, but the tackifier (Y) does not easily accumulate around the block (B). Therefore, the block (B) is not easily affected by the tackifier (Y), and the adhesive force can be favorably maintained.

Particularly, when the cyclic structure (first cyclic structure) of the block (A) and the cyclic structure (second cyclic structure) of the tackifier (Y) are aromatic ring structures, the insulation breakdown resistance of the adhesive composition further enhances.

In addition, the block copolymer (X) only forms a pseudo-crosslinking structure, that is, is not actually crosslinked, and thus the molecular weight is low (specifically, the mass-average molecular weight is preferably approximately 100,000 to 550,000) and the coating properties is also excellent. Therefore, it is not necessary to dilute the block copolymer with a solvent more than necessary for use, and thus it is possible to apply the adhesive thickly in a small number of times of coating.

<Applications>

The adhesive composition according to the present embodiment can be used for a variety of applications. Particularly, the adhesive composition according to the present embodiment is preferred as an adhesive for electrostatic capacitance-type touch panel displays.

The adhesive composition according to the present embodiment is also excellent in terms of the insulation breakdown resistance as well as the adhesive force and the thermal creep resistance, and thus, in a case in which the adhesive composition according to the present embodiment is used to attach, for example, a front panel and a touch panel, even when static electricity is generated in the front panel, it is possible to prevent the static electricity from reaching the touch panel from the front panel.

EXAMPLES

Hereinafter, the present invention will be specifically described using examples, but the present invention is not limited thereto.

Manufacturing Example 1: Manufacturing of RAFT Agent (R-1)

1.6-hexanedithiol (0.902 g, 6.00 mmol), carbon disulfide (1.83 g, 24.0 mmol), and dimethylformamide (11 mL) were injected into a two-neck flask and were stirred at 25° C. using a magnetic stirrer. Triethylamine (2.49 g, 24.6 mmol) was added dropwise thereto over 15 minutes and was further stirred at 25° C. for three hours. After the end of the dropwise addition, the change of the color of the reaction solution in the flask from colorless transparent to yellow was observed.

Subsequently, methyl-α-bromophenylacetate (2.75 g, 12.0 mmol) was added dropwise over 15 minutes and was further stirred at 25° C. for four hours. In the middle of the stirring, precipitate in the flask was observed.

Next, an extraction solvent (n-hexane/ethyl acetate=50/50) (100 mL) and water (50 mL) were added to the reaction solution, thereby carrying out liquid separation extraction. The same extraction solvent (n-hexane/ethyl acetate=50/50) (50 mL) as above was added to the obtained water phase, thereby carrying out additional liquid separation extraction. The organic phases obtained in the first liquid separation extraction and the second liquid separation extraction were mixed with each other, and the mixed organic phase was sequentially washed with 1 M hydrochloric acid (50 mL), water (50 mL), and saturated saline water (50 mL). After the washed organic phase was dried by adding sodium sulfate thereto, the sodium sulfate was filtered, the filtrate was concentrated using an evaporator, thereby distilling the organic solvent away at reduced pressure. The obtained concentrate was purified with silica gel column chromatography (developing solvent: n-hexane/ethyl acetate=80/20), thereby obtaining a RAFT agent (R-1) (2.86 g) (yield: 80%) as a yellow oily substance.

The attribution of the $^1$H-NMR spectrum of the obtained RAFT agent (R-1) is described below. Note that, in the measurement of $^1$H-NMR, a nuclear magnetic resonance analyzer ("R-1200" manufactured by Hitachi Ltd.) was used.

$^1$H-NMR (60 MHz in CDCl$_3$): δ7.50-7.05 (m, 10H, ArH), δ5.82 (s, 2H, CH—COO), δ3.73 (s, 6H, CH$_3$), δ3.33 (brt, 4H, S—CH$_2$), δ1.85-1.22 (m, 8H, CH$_2$).

From the $^1$H-NMR spectrum, the structures of methyl-α-phenylacetate and the dithiol-derived alkyl group could be confirmed. Therefore, in Manufacturing Example 1, it was determined that a compound represented by General Formula (2) (Compound (2)) was obtained as the RAFT agent (R-1).

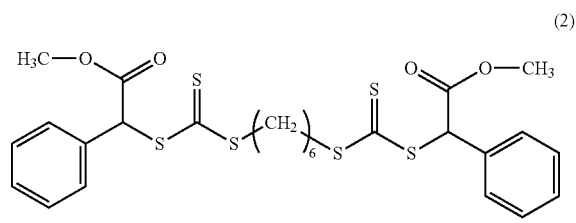

(2)

Manufacturing Example 2: Manufacturing of RAFT Agent (R-2)

A RAFT agent (R-2) (2.25 g) (yield: 98%) was obtained as a yellow oily substance in the same manner as in Manufacturing Example 1 except for the fact that 1.6-hexanedithiol (0.902 g, 6.00 mmol) was changed to 1-dodecanethiol (1.214 g, 6.00 mmol), the amount of carbon disulfide was changed from 1.83 g (24.0 mmol) to 0.915 g (12.0 mmol), the amount of triethylamine was changed from 2.49 g (24.6 mmol) to 1.25 g (12.3 mmol), and methyl-α-bromophenylacetate (2.75 g, 12.0 mmol) was changed to (1-bromoethyl)benzene (1.11 g, 6.00 mmol).

The attribution of the $^1$H-NMR spectrum of the obtained RAFT agent (R-2) is described below.

$^1$H-NMR (60 MHz in CDCl$_3$): δ7.60-7.12 (m, 5H, ArH), δ5.34 (q, J=6.9 Hz, 1H, S—CH), δ3.34 (brt, 2H, S—CH$_2$), δ1.76 (d, J=6.9 Hz, 3H, CH₃), δ1.70-1.05 (m, 20H, —CH₂—), δ0.89 (brt, 3H, CH₃).

From the ¹H-NMR spectrum, the structures of (1-bromoethyl)benzene and the dodecanethiol-derived alkyl group could be confirmed. Therefore, in Manufacturing Example 2, it was determined that a compound represented by General Formula (3) (Compound (3)) was obtained as the RAFT agent (R-2).

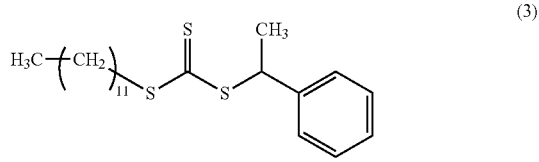

(3)

Manufacturing Example 3: Manufacturing of Block Copolymer (X-1)

(Manufacturing of Block (A))

Styrene (St) (70.0 g), methyl acrylate (MA) (5.0 g), ethyl acrylate (EA) (9.0 g), 2-hydroxyethyl acrylate (HEA) (2.0 g), acrylic acid (AA) (14.0 g), the RAFT agent (R-1) (1.9 g), and 2,2'-azobis(2-methylbutylonitrile) (ABN-E) (0.35 g) were injected into a two-neck flask, and the inside of the flask was heated to 85° C. while substituting the inside with nitrogen gas. After that, the components were stirred at 85° C. for six hours, thereby causing a polymerization reaction (first stage reaction).

After the end of the reaction, n-hexane (4000 g) was injected into the flask, and stirring was carried out to precipitate the reactants, then, unreacted monomers (St, MA, EA, HEA, and AA) and the RAFT agent were filtered, and the reactants were dried at 70° C. under reduced pressure, thereby obtaining a copolymer (block (A)).

The glass transition temperature, number-average molecular weight (Mn), and mass-average molecular weight (Mw) of the obtained copolymer (block (A)) are shown in Table 1.

(Manufacturing of Block Copolymer (X-1))

A mixture constituted of butyl acrylate (BA) (100 g), ABN-E (0.027 g), and ethyl acetate (50 g) and the previously-obtained copolymer (block (A)) were injected into a two-neck flask, and the inside of the flask was heated to 85° C. while substituting the inside with nitrogen gas. After that, the components were stirred at 85° C. for six hours so as to cause a polymerization reaction (second stage reaction), thereby obtaining a reaction fluid including a block copolymer (X-1) formed of the block (A) and the block (B). Note that the mixture and the block (A) were blended with each other in a blending amount at which the mass ratio between the block (A) and the block (B) in the obtained block copolymer (X-1) was 25/75.

A part of the reaction fluid was collected, n-hexane (4000 g) was injected into the part of the reaction fluid, and stirring was carried out to precipitate the reactants, an unreacted monomer (BA) and a solvent were filtered, and the reactants were dried at 70° C. under reduced pressure, thereby extracting the block copolymer (X-1) from the reaction fluid.

The glass transition temperature of the block (B), the number-average molecular weight (Mn), mass-average molecular weight (Mw), and acid value of the block copolymer (X-1) are shown in Table 1.

<Manufacturing Example 4: Manufacturing of Block Copolymers (X-2) to (X-14)>

Block copolymers (X-2) to (X-14) were manufactured in the same manner as in Manufacturing Example 1 except for the fact that the monomer compositions constituting the block (A) and the block (B) were changed as shown in Tables 1 and 2, the polymerization conditions of the first stage reaction and the second stage reaction were changed as shown in Tables 1 and 2, and the mass ratios between the block (A) and the block (B) were changed as shown in Tables 1 and 2, and a variety of measurements were carried out. The results are shown in Tables 1 and 2.

Note that, in the manufacturing of the block copolymer X-10, ethyl acetate (67.7 g) was used as the solvent in the first stage reaction.

Manufacturing Example 5: Manufacturing of Random Copolymer (X-15)

St (18.2 g), AA (1.8 g), BA (80 g), ABN-E (0.5 g), and ethyl acetate (200 g) were injected into a two-neck flask, and the inside of the flask was heated to 85° C. while substituting the inside with nitrogen gas. After that, the components were stirred at 85° C. for six hours so as to cause a polymerization reaction, thereby obtaining a reaction fluid including a random copolymer (X-15).

A part of the reaction fluid was collected, n-hexane (4000 g) was injected into the part of the reaction fluid, stirring was carried out to precipitate the reactants, unreacted monomers (St, AA, and BA) and a solvent were filtered, and the reactants were dried at 70° C. under reduced pressure, thereby extracting the random copolymer (X-15) from the reaction fluid.

The number-average molecular weight (Mn), mass-average molecular weight (Mw), and acid value of the obtained random copolymer (X-15) are shown in Table 3.

<Measurement and Evaluation>

(Calculation of Glass Transition Temperatures)

The glass transition temperature of the block (A) was obtained from the Fox equation represented by Equation (i) above, and the glass transition temperature of the block (B) was obtained from the Fox equation represented by Equation (ii) above.

(Measurement of Molecular Weights)

The number-average molecular weight (Mn) and the mass-average molecular weight (Mw) were measured by gel permeation chromatography (GPC) under the following conditions. Note that the number-average molecular weight (Mn) and the mass-average molecular weight (Mw) are polystyrene-equivalent values.

GPC measurement conditions:
GPC apparatus: GPC-101 (manufactured by Shoko Co., Ltd.)
Column: Two Shodex A-806M connected in series (manufactured by Showa Denko K.K.)
Detector: Shodex RI-71 (manufactured by Showa Denko K.K.)
Mobile phase: Tetrahydrofuran
Flow rate: 1 mL/minute (Measurement of Acid Values)

The acid values of specimens were measured by titrating a solution prepared by dissolving potassium hydroxide in methanol so as to be 0.1 N potassium hydroxide.

(Insulation Breakdown Resistance Test)

The adhesive composition was applied onto a 150 mm×150 mm-size polyethylene terephthalate (PET) film which had been surface-treated with a mold release agent so that the dried film thickness was 200 μm, and a 150 mm×150 mm-size adhesive layer was formed and used as a test piece.

An insulation breakdown resistance test was carried out on the test piece according to JIS C 2110-1, and the insulation breakdown strength was measured and evaluated according to the following evaluation standards.

A (○): The insulation breakdown strength is 55 kV/mm or more.

B (Δ): The insulation breakdown strength is 50 kV/mm or more and less than 55 kV/mm.

C (X): The insulation breakdown strength is less than 50 kV/mm.

(Measurement of Adhesive Force)

The adhesive composition was applied onto substantially the center of a 30 mm×40 mm-size stainless steel plate so that the dried film thickness was 25 μm, and a 25 mm×25 mm-size adhesive layer was formed. The stainless steel plate and a 25 mm×100 mm-size PET film were attached to each other with this adhesive layer interposed therebetween, thereby obtaining a test piece.

The adhesive force of the PET film in the test piece was measured according to 8.3.1 "180° peeling test" of JIS Z 0237:2009 and evaluated according to the following evaluation standards.

A (○): The adhesive force is 20 N/25 mm or more.

B (Δ): The adhesive force is 10 N/25 mm or more and less than 20 N/25 mm.

C (X): The adhesive force is less than 10 N/25 mm.

(Evaluation of Thermal Creep Resistance)

A test piece was produced in the same manner as in the case of the measurement of the adhesive force.

According to JIS Z 0237:2009, the test piece was reciprocally pressed once from the PET film side using a pressing roll, and then this test piece was installed in a creep tester adjusted to 40° C. In an environment of 100° C. or 150° C., the time taken for the PET film to which a weight of 1 kg was attached to drop from the stainless steel plate was measured. Note that, in a case in which the PET film did not drop from the stainless steel plate even after one hour elapsed, the misalignment (the distance from the location before the test to the location one hour after the beginning of the test) of the PET film after the elapsing of one hour was measured. The drop time (minutes) or the misalignment (mm) is used as the thermal creep resistance index, and a decrease in the misalignment (mm) means that the thermal creep resistance becomes more favorable. In addition, in a case in which the PET film drops from the stainless steel plate, an increase in the drop time (minutes) means that the thermal creep resistance becomes more favorable. Misalignment of 1 mm or less was evaluated as pass, and the thermal creep resistance was evaluated according to the following evaluation standards.

A (○): The thermal creep resistance is evaluated as pass in the environment of 100° C. and the environment of 150° C.

B (Δ): The thermal creep resistance is evaluated as pass in the environment of 100° C., but is evaluated as fail in the environment of 150° C.

C (X): The thermal creep resistance is evaluated as fail in the environment of 100° C.

Example 1

A terpene phenol copolymer ("YS POLYSTER TH130" manufactured by Yasuhara Chemical Co., Ltd.) was dissolved in toluene as the tackifier, thereby preparing a tackifier solution.

The tackifier solution was added to the reaction fluid including the block copolymer (X-1) so that the solid content-equivalent amount (parts by mass) of the tackifier was 30 parts by mass with respect to 100 parts by mass of the solid content of the block copolymer (X-1), thereby preparing an adhesive composition.

For the obtained adhesive composition, the insulation breakdown strength and the adhesive force were measured, and the thermal creep resistance was evaluated. These results are shown in Table 4.

Examples 2 to 16 and Comparative Examples 1 to 5 and 7 to 11

Adhesive compositions were prepared in the same manner as in Example 1 except for the fact that the types of the block copolymer (X), the types of the tackifier, and the blending amounts were changed as shown in Tables 4 to 8, and a variety of measurements and evaluations were carried out. The results are shown in Tables 4 to 8.

Comparative Example 6

An adhesive composition was prepared in the same manner as in Example 1 except for the fact that a random copolymer (X-15) was used instead of the block copolymer (X-1), and the types of the tackifier and the blending amounts were changed as shown in Table 7, and a variety of measurements and evaluations were carried out. The results are shown in Table 7.

TABLE 1

| | Block copolymer (X) | | X-1 | X-2 | X-3 | X-4 | X-5 | X-6 | X-7 |
|---|---|---|---|---|---|---|---|---|---|
| Block (A) | Monomer composition [g] | St | 70.0 | 86.3 | 91.3 | 84.6 | 86.3 | 84.6 | 81.0 |
| | | MA | 5.0 | 0 | 0 | 0 | 0 | 0 | 0 |
| | | EA | 9.0 | 0 | 0 | 0 | 0 | 0 | 0 |
| | | CHMA | 0 | 0 | 0 | 0 | 0 | 0 | 0 |
| | | HEA | 2.0 | 2.3 | 0 | 1.4 | 2.3 | 1.4 | 1.5 |
| | | HEMA | 0 | 0 | 0 | 0 | 0 | 0 | 0 |
| | | MAA | 0 | 0 | 0 | 0 | 0 | 0 | 0 |
| | | AA | 14.0 | 11.4 | 8.7 | 14.0 | 11.4 | 14.0 | 17.5 |
| | Polymerization conditions [g] | Ethyl acetate | 0 | 0 | 0 | 0 | 0 | 0 | 0 |
| | | ABN-E | 0.35 | 0.15 | 0.20 | 0.35 | 0.15 | 0.35 | 0.20 |
| | | RAFT agent (R-1) | 1.9 | 3.0 | 3.0 | 1.9 | 3.0 | 1.9 | 0 |
| | | RAFT agent (R-2) | 0 | 0 | 0 | 0 | 0 | 0 | 1.2 |
| | Glass transition temperature [° C.] | | 76 | 97 | 101 | 99 | 97 | 99 | 99 |
| | Number-average molecular weight (Mn) | | 21000 | 27000 | 24000 | 19000 | 27000 | 19000 | 21000 |
| | Mass-average molecular weight (Mw) | | 32000 | 44000 | 37000 | 30000 | 44000 | 30000 | 26000 |
| | Mw/Mn | | 1.5 | 1.6 | 1.5 | 1.6 | 1.6 | 1.6 | 1.2 |

TABLE 1-continued

| Block copolymer (X) | | | X-1 | X-2 | X-3 | X-4 | X-5 | X-6 | X-7 |
|---|---|---|---|---|---|---|---|---|---|
| Block (B) | Monomer composition [g] | BA | 100 | 100 | 100 | 100 | 100 | 73 | 100 |
| | | EHA | 0 | 0 | 0 | 0 | 0 | 27 | 0 |
| | | HEA | 0 | 0 | 0 | 0 | 0 | 0 | 0 |
| | | AA | 0 | 0 | 0 | 0 | 0 | 0 | 0 |
| | Polymerization conditions [g] | Ethyl acetate | 50 | 50 | 50 | 50 | 50 | 50 | 50 |
| | | ABN-E | 0.027 | 0.015 | 0.058 | 0.027 | 0.032 | 0.071 | 0.075 |
| | Proportion of unit (1) [mass %] | | 100 | 100 | 100 | 100 | 100 | 73 | 100 |
| | Glass transition temperature [° C.] | | −54 | −54 | −54 | −54 | −54 | −59 | −54 |
| Block copolymer (X) | Block (A)/block (B) | | 25/75 | 10/90 | 23/77 | 25/75 | 40/60 | 25/75 | 20/80 |
| | Number-average molecular weight (Mn) | | 75000 | 170000 | 100000 | 75000 | 78000 | 121000 | 82000 |
| | Mass-average molecular weight (Mw) | | 140000 | 521000 | 255000 | 140000 | 200000 | 228000 | 183000 |
| | Mw/Mn | | 1.9 | 3.1 | 2.6 | 1.9 | 2.6 | 1.9 | 2.2 |
| | Acid value [mgKOH/g] | | 28.5 | 9.5 | 8.9 | 28.5 | 14.6 | 28.5 | 28.4 |

TABLE 2

| Block copolymer (X) | | | X-8 | X-9 | X-10 | X-11 | X-12 | X-13 | X-14 |
|---|---|---|---|---|---|---|---|---|---|
| Block (A) | Monomer composition [g] | St | 91.3 | 60.0 | 0 | 85.2 | 86.3 | 100.0 | 90.9 |
| | | MA | 0 | 0 | 0 | 0 | 0 | 0 | 0 |
| | | EA | 0 | 24.0 | 0 | 0 | 0 | 0 | 0 |
| | | CHMA | 0 | 0 | 87.7 | 0 | 0 | 0 | 0 |
| | | HEA | 0 | 2.0 | 0 | 1.3 | 2.3 | 0 | 2.6 |
| | | HEMA | 0 | 0 | 1.3 | 0 | 0 | 0 | 0 |
| | | MAA | 0 | 0 | 11.0 | 0 | 0 | 0 | 0 |
| | | AA | 8.7 | 14.0 | 0 | 13.5 | 11.4 | 0 | 6.5 |
| | Polymerization conditions [g] | Ethyl acetate | 0 | 0 | 67.7 | 0 | 0 | 0 | 0 |
| | | ABN-E | 0.20 | 0.35 | 0.10 | 0.30 | 0.15 | 0.20 | 0.15 |
| | | RAFT agent (R-1) | 0 | 1.9 | 1.5 | 1.7 | 3.0 | 2.4 | 3.0 |
| | | RAFT agent (R-2) | 3.0 | 0 | 0 | 0 | 0 | 0 | 0 |
| | Glass transition temperature [° C.] | | 101 | 58 | 78 | 99 | 97 | 100 | 96 |
| | Number-average molecular weight (Mn) | | 24000 | 19000 | 27000 | 19000 | 17000 | 29000 | 25000 |
| | Mass-average molecular weight (Mw) | | 37000 | 30000 | 38000 | 28000 | 44000 | 39000 | 38000 |
| | Mw/Mn | | 1.5 | 1.6 | 1.4 | 1.5 | 1.6 | 1.3 | 1.5 |
| Block (B) | Monomer composition [g] | BA | 100 | 100 | 100 | 0 | 100 | 95.3 | 100 |
| | | EHA | 0 | 0 | 0 | 0 | 0 | 0 | 0 |
| | | HEA | 0 | 0 | 0 | 0 | 0 | 0.8 | 0 |
| | | AA | 0 | 0 | 0 | 0 | 0 | 3.9 | 0 |
| | Polymerization conditions [g] | Ethyl acetate | 50 | 50 | 50 | 50 | 50 | 50 | 50 |
| | | ABN-E | 0.058 | 0.027 | 0.0045 | 0.040 | 0.032 | 0.0229 | 0.024 |
| | Proportion of unit (1) [mass %] | | 100 | 100 | 100 | 0 | 100 | 95.3 | 100 |
| | Glass transition temperature [° C.] | | −54 | −54 | −54 | −70 | −54 | −51 | −54 |
| Block copolymer (X) | Block (A)/block (B) | | 30/70 | 25/75 | 26/74 | 25/75 | 50/50 | 25/75 | 14/86 |
| | Number-average molecular weight (Mn) | | 80000 | 73000 | 71000 | 38000 | 65000 | 80000 | 129000 |
| | Mass-average molecular weight (Mw) | | 190000 | 130000 | 105000 | 70000 | 180000 | 177000 | 383000 |
| | Mw/Mn | | 2.4 | 1.8 | 1.5 | 1.8 | 2.8 | 2.2 | 3.0 |
| | Acid value [mgKOH/g] | | 20.5 | 28.0 | 21.1 | 24.9 | 18.4 | 17.6 | 7.0 |

TABLE 3

| Random copolymer | | X-15 |
|---|---|---|
| Monomer composition [g] | St | 18.2 |
| | AA | 1.8 |
| | BA | 80 |
| Polymerization conditions [g] | Ethyl acetate | 200 |
| | ABN-E | 0.5 |
| Random copolymer | Number-average molecular weight (Mn) | 66000 |
| | Mass-average molecular weight (Mw) | 131000 |
| | Mw/Mn | 2.0 |
| | Acid value [mgKOH/g] | 17.5 |

TABLE 4

| | | Examples | | | | | |
|---|---|---|---|---|---|---|---|
| | | 1 | 2 | 3 | 4 | 5 | 6 |
| Copolymer | Type | X-1 | X-2 | X-3 | X-4 | X-4 | X-4 |
| | Amount [parts by mass] | 100 | 100 | 100 | 100 | 100 | 100 |
| Tackifier [parts by mass] | YS POLYSTER TH130 | 30 | 0 | 0 | 0 | 0 | 0 |
| | PENSEL D-135 | 0 | 0 | 0 | 0 | 0 | 0 |
| | YS POLYSTER G150 | 0 | 20 | 0 | 5 | 10 | 20 |
| | SUPER ESTER A-125 | 0 | 0 | 30 | 0 | 0 | 0 |

TABLE 4-continued

|  |  | Examples | | | | | |
| --- | --- | --- | --- | --- | --- | --- | --- |
|  |  | 1 | 2 | 3 | 4 | 5 | 6 |
|  | NIKANOL HP150 | 0 | 0 | 0 | 0 | 0 | 0 |
|  | NIKANOL HP100 | 0 | 0 | 0 | 0 | 0 | 0 |
|  | PINECRYSTAL KE311 | 0 | 0 | 0 | 0 | 0 | 0 |
|  | ARKON M-135 | 0 | 0 | 0 | 0 | 0 | 0 |
| Insulation breakdown test | Insulation breakdown strength [kV/mm] | 51 | 52 | 55 | 50 | 55 | 61 |
|  | Evaluation | B | B | A | B | A | A |
| Adhesive force | Adhesive force [N/25 mm] | 15 | 16 | 12 | 23 | 22 | 25 |
|  | Evaluation | B | B | B | A | A | A |
| Thermal creep resistance | 100° C. × 1 kg | 0 mm | 1 mm | 1 mm | 0 mm | 0 mm | 0 mm |
|  | 150° C. × 1 kg | 0 mm | 0 mm | 0 mm | 0 mm | 0 mm | 0 mm |
|  | Evaluation | A | A | A | A | A | A |

TABLE 5

|  |  | Examples | | | | | |
| --- | --- | --- | --- | --- | --- | --- | --- |
|  |  | 7 | 8 | 9 | 10 | 11 | 12 |
| Copolymer | Type | X-1 | X-4 | X-4 | X-5 | X-6 | X-7 |
|  | Amount [parts by mass] | 100 | 100 | 100 | 100 | 100 | 100 |
| Tackifier [parts by mass] | YS POLYSTER TH130 | 0 | 0 | 0 | 0 | 0 | 20 |
|  | PENSEL D-135 | 0 | 30 | 0 | 0 | 0 | 0 |
|  | YS POLYSTER G150 | 0 | 0 | 40 | 0 | 20 | 0 |
|  | SUPER ESTER A-125 | 0 | 0 | 0 | 20 | 0 | 0 |
|  | NIKANOL HP150 | 20 | 0 | 0 | 0 | 0 | 0 |
|  | NIKANOL HP100 | 0 | 0 | 0 | 0 | 0 | 0 |
|  | PINECRYSTAL KE311 | 0 | 0 | 0 | 0 | 0 | 0 |
|  | ARKON M-135 | 0 | 0 | 0 | 0 | 0 | 0 |
| Insulation breakdown test | Insulation breakdown strength [kV/mm] | 62 | 61 | 68 | 59 | 60 | 58 |
|  | Evaluation | A | A | A | A | A | A |
| Adhesive force | Adhesive force [N/25 mm] | 25 | 20 | 12 | 13 | 16 | 15 |
|  | Evaluation | A | A | B | B | B | B |
| Thermal creep resistance | 100° C. × 1 kg | 0 mm | 0 mm | 0 mm | 0 mm | 0 mm | 0 mm |
|  | 150° C. × 1 kg | 0 mm | 0 mm | 0 mm | one minute | 0 mm | one minute |
|  | Evaluation | A | A | A | B | A | B |

TABLE 6

|  |  | Examples | | | |
| --- | --- | --- | --- | --- | --- |
|  |  | 13 | 14 | 15 | 16 |
| Copolymer | Type | X-8 | X-4 | X-10 | X-10 |
|  | Amount [parts by mass] | 100 | 100 | 100 | 100 |
| Tackifier [parts by mass] | YS POLYSTER TH130 | 0 | 0 | 0 | 0 |
|  | PENSEL D-135 | 20 | 0 | 20 | 0 |
|  | YS POLYSTER G150 | 0 | 0 | 0 | 0 |
|  | SUPER ESTER A-125 | 0 | 0 | 0 | 0 |
|  | NIKANOL HP150 | 0 | 0 | 0 | 0 |
|  | NIKANOL HP100 | 0 | 0 | 0 | 0 |
|  | PINECRYSTAL KE311 | 0 | 0 | 0 | 0 |
|  | ARKON M-135 | 0 | 20 | 0 | 20 |
| Insulation breakdown test | Insulation breakdown strength [kV/mm] | 61 | 51 | 50 | 54 |
|  | Evaluation | A | B | B | B |
| Adhesive force | Adhesive force [N/25 mm] | 20 | 24 | 22 | 23 |
|  | Evaluation | A | A | A | A |
| Thermal creep resistance | 100° C. × 1 kg | 0 mm | 0 mm | 0 mm | 0 mm |
|  | 150° C. × 1 kg | one minute | 0 mm | 0 mm | 0 mm |
|  | Evaluation | B | A | A | A |

TABLE 7

|  |  | Comparative Examples | | | | | |
| --- | --- | --- | --- | --- | --- | --- | --- |
|  |  | 1 | 2 | 3 | 4 | 5 | 6 |
| Copolymer | Type | X-9 | X-11 | X-12 | X-13 | X-14 | X-15 |
|  | Amount [parts by mass] | 100 | 100 | 100 | 100 | 100 | 100 |
| Tackifier [parts by mass] | YS POLYSTER TH130 | 0 | 0 | 0 | 0 | 0 | 0 |
|  | PENSEL D-135 | 0 | 0 | 0 | 0 | 0 | 20 |
|  | YS POLYSTER G150 | 20 | 20 | 20 | 0 | 20 | 0 |
|  | SUPER ESTER A-125 | 0 | 0 | 0 | 0 | 0 | 0 |

TABLE 7-continued

|  |  | Comparative Examples | | | | | |
|---|---|---|---|---|---|---|---|
|  |  | 1 | 2 | 3 | 4 | 5 | 6 |
|  | NIKANOL HP150 | 0 | 0 | 0 | 20 | 0 | 0 |
|  | NIKANOL HP100 | 0 | 0 | 0 | 0 | 0 | 0 |
|  | PINECRYSTAL KE311 | 0 | 0 | 0 | 0 | 0 | 0 |
|  | ARKON M-135 | 0 | 0 | 0 | 0 | 0 | 0 |
| Insulation breakdown test | Insulation breakdown strength [kV/mm] | 44 | 59 | 60 | 42 | 52 | 35 |
|  | Evaluation | C | A | A | C | B | C |
| Adhesive force | Adhesive force [N/25 mm] | 12 | 2 | 3 | 19 | 26 | 25 |
|  | Evaluation | B | C | C | B | A | A |
| Thermal creep resistance | 100° C. × 1 kg | 0 mm | 0 mm | 0 mm | 1 mm | 5 mm | one minute |
|  | 150° C. × 1 kg | 0 mm | 0 mm | 0 mm | Three minutes | one minute | one minute |
|  | Evaluation | A | A | A | B | C | C |

TABLE 8

|  |  | Comparative Examples | | | | |
|---|---|---|---|---|---|---|
|  |  | 7 | 8 | 9 | 10 | 11 |
| Copolymer | Type | X-4 | X-4 | X-4 | X-4 | X-4 |
|  | Amount [parts by mass] | 100 | 100 | 100 | 100 | 100 |
| Tackifier | YS POLYSTER TH130 | 0 | 0 | 0 | 0 | 0 |
| [parts by mass] | PENSEL D-135 | 0 | 0 | 0 | 0 | 0 |
|  | YS POLYSTER G150 | 50 | 0 | 0 | 0 | 0 |
|  | SUPER ESTER A-125 | 0 | 0 | 0 | 0 | 0 |
|  | NIKANOL HP150 | 0 | 0 | 0 | 0 | 0 |
|  | NIKANOL HP100 | 0 | 0 | 20 | 0 | 0 |
|  | PINECRYSTAL KE311 | 0 | 0 | 0 | 20 | 0 |
|  | ARKON M-135 | 0 | 0 | 0 | 0 | 2 |
| Insulation breakdown test | Insulation breakdown strength [kV/mm] | 72 | 40 | 41 | 42 | 42 |
|  | Evaluation | A | C | C | C | C |
| Adhesive force | Adhesive force [N/25 mm] | 3 | 22 | 23 | 21 | 23 |
|  | Evaluation | C | A | A | A | A |
| Thermal creep resistance | 100° C. × 1 kg | one minute | 0 mm | 0 mm | 0 mm | 0 mm |
|  | 150° C. × 1 kg | one minute | 0 mm | 0 mm | 0 mm | 0 mm |
|  | Evaluation | C | A | A | A | A |

Abbreviations in Tables 1 to 8 represent the following compounds. Note that Tg (glass transition temperature) of each monomer in parentheses represents Tg of a homopolymer. In addition, "proportion of unit (1)" in Tables 1 and 2 represents the content (mass %) of the (meth)acrylic acid ester unit represented by General Formula (1) when the content of all of the constituent units constituting the block (B) is 100 mass %.

"St": Styrene (Tg: 100° C.),
"MA": Methyl acrylate (Tg: 10° C.),
"EA": Ethyl acrylate (Tg: −24° C.),
"CHMA": Cyclohexyl methacrylate (Tg: 66° C.),
"HEA": 2-Hydroxyethyl acrylate (Tg: −15° C.),
"HEMA": 2-Hydroxyethyl methacrylate (Tg: 55° C.),
"MAA": Methacrylic acid (Tg: 228° C.),
"AA": Acrylic acid (Tg: 106° C.),
"BA": Butyl acrylate (Tg: −54° C.),
"EHA": 2-Ethylhexyl acrylate (Tg: −70° C.),
"YS POLYSTER TH130": Terpene phenol resin (softening point: 130° C., manufactured by Yasuhara Chemical Co., Ltd.),
"PENSEL D-135": Polymerized rosin ester resin (softening point: 135° C., manufactured by Arakawa Chemical Industries, Ltd.),
"YS POLYSTER G150": Terpene phenol resin (softening point: 150° C., manufactured by Yasuhara Chemical Co., Ltd.),
"SUPER ESTER A-125": Special rosin ester resin (softening point: 125° C., manufactured by Arakawa Chemical Industries, Ltd.),
"NIKANOL HP150": Xylene resin (softening point: 170° C., manufactured by Fudow Co., Ltd.),
"NIKANOL HP100": Xylene resin (softening point: 115° C., manufactured by Fudow Co., Ltd.),
"PINECRYSTAL KE311": Rosin ester resin (softening point: 95° C., manufactured by Arakawa Chemical Industries, Ltd.),
"ARKON M-135": Alicyclic saturated hydrocarbon resin (softening point: 135° C., manufactured by Arakawa Chemical Industries, Ltd.).

As apparent from Tables 4 to 6, the adhesive compositions of the respective examples had a high adhesive force, excellent insulation breakdown resistance, and excellent thermal creep resistance. Particularly, the adhesive compositions of Examples 1 to 13 and 16 in which the cyclic structure (first cyclic structure) in the block (A) in the block copolymer (X) and the cyclic structure (second cyclic structure) in the tackifier (Y) were compounds of the same system had a high insulation breakdown strength. Among these, Examples 1 to 13 in which the cyclic structure (first cyclic structure) in the block (A) and the cyclic structure (second cyclic structure) in the tackifier (Y) were aromatic ring structures had a higher insulation breakdown strength and superior insulation breakdown resistance.

Whether or not the final products in Manufacturing Examples 3 and 4 were block copolymers was determined as described below.

For example, the number-average molecular weight (Mn) of the copolymer (block (A)) obtained in Manufacturing Example 3 was 21000, the mass-average molecular weight (Mw) was 32000, and the ratio therebetween (Mw/Mn) was 1.5. On the other hand, the number-average molecular weight (Mn) of the block copolymer (X-1) obtained in Manufacturing Example 3 was 75000, the mass-average molecular weight (Mw) was 140000, and the ratio therebetween (Mw/Mn) was 1.9.

From these results, it was found that the molecular weight peak of the copolymer (block (A)) disappeared and the molecular weight of the block copolymer (X) was higher than the molecular weight of the copolymer (block (A)).

Therefore, in Manufacturing Example 3, it was determined that a block copolymer formed of a copolymer block (block (A)) including a St unit, a MA unit, an EA unit, a HEA unit, and an AA as the constituent units and a polymer block (block (B)) including a BA unit as the constituent unit was obtained.

Manufacturing Example 4 (block copolymers (X-2) to (X-14)) were also determined in the same manner.

In addition, since the RAFT agent (R-1) is a dimer of trithiocarbonate, the block copolymers (X-1) to (X-6) and (X-9) to (X-14) are considered to be triblock copolymers formed of the block (A)-the block (B)-the block (A).

On the other hand, since the RAFT agent (R-2) is a monomer of trithiocarbonate, the block copolymers (X-7) and (X-8) are considered to be diblock copolymers formed of the block (A)-the block (B).

As apparent from Tables 7 and 8, the adhesive composition of Comparative Example 1 in which the block copolymer (X-9) in which the glass transition temperature of the block (A) was 58° C. was used had poor insulation breakdown resistance.

The adhesive composition of Comparative Example 2 in which the block copolymer (X-11) in which the block (B) did not include the acrylic acid ester unit represented by General Formula (I) was used had a weak adhesive force.

The adhesive composition of Comparative Example 3 in which the block copolymer (X-12) in which the ratio between the block (A) and the block (B) (block (A)/block (B)) was 50/50 was used had a weak adhesive force.

The acid value of the block copolymer (X-13) was 17.6 mgKOH/g, but the block (A) was constituted only of the St unit, and the acid value of the block (A) was 0 mgKOH/g (that is, the acid value of the block copolymer (X) was all derived from the block (B)). Therefore, the adhesive composition of Comparative Example 4 in which the block copolymer (X-13) was used had poor insulation breakdown resistance.

The adhesive composition of Comparative Example 5 in which the block copolymer (X-14) in which the acid value derived from the block (A) was 7.0 mgKOH/g was used had poor thermal creep resistance.

The adhesive composition of Comparative Example 6 in which the random copolymer (X-15) was used had poor insulation breakdown resistance and poor thermal creep resistance.

The adhesive composition of Comparative Example 7 in which the content of the tackifier (Y) was 50 parts by mass had a weak adhesive force and poor thermal creep resistance.

The adhesive composition of Comparative Example 8 which did not include the tackifier (Y) had poor insulation breakdown resistance.

The adhesive compositions of Comparative Examples 9 and 10 in which the tackifier (Y) having a softening point of lower than 120° C. was used had poor insulation breakdown resistance.

The adhesive composition of Comparative Example 11 in which the content of the tackifier (Y) was 2 parts by mass had poor insulation breakdown resistance.

The invention claimed is:

1. An adhesive composition, comprising:
a block copolymer (X) formed of a block (A) and a block (B), the block (A) having a glass transition temperature of 75° C. or higher, the block (A) including a monomer unit having a first cyclic structure and a carboxyl group-containing monomer unit, the block (B) including 70% or more of an acrylic acid ester unit represented by General Formula (1); and
a tackifier (Y) having a softening point of 120° C. or higher and a second cyclic structure,
wherein a mass ratio of the block (A) to the block (B) (block (A)/block (B)) is 10/90 to 40/60,
in an acid value of the block copolymer (X), an acid value derived from the block (A) is 8 mgKOH/g or more,
at least one end of the block copolymer (X) is the block (A),
a content of the tackifier (Y) is 5 to 30 parts by mass with respect to 100 parts by mass of the block copolymer (X),
the General Formula (1) is $CH_2=CR^1-COOR^2$, and
$R^1$ represents a hydrogen atom, and $R^2$ represents a linear alkyl group or alkoxyalkyl group having 8 or less carbon atoms.

2. The adhesive composition according to claim 1, wherein the first cyclic structure in the block (A) and the second cyclic structure in the tackifier (Y) are aromatic ring structures.

3. The adhesive composition according to claim 1, wherein insulation breakdown strength is 50 kV/mm or more.

* * * * *